United States Patent [19]

Corsi

[11] Patent Number: 5,014,542
[45] Date of Patent: May 14, 1991

[54] AUTOMATIC MACHINE TOOL HEAD DESIGNED TO INCREASE THE NUMBER OF MACHINE OPERATING AXES

[75] Inventor: Armando Corsi, Piacenza, Italy

[73] Assignee: JOBS S.p.A., Piacenza, Italy

[21] Appl. No.: 312,979

[22] Filed: Feb. 21, 1989

[30] Foreign Application Priority Data

Mar. 9, 1988 [IT] Italy .............................. 44804 A/88

[51] Int. Cl.$^5$ .............................................. B25J 11/00
[52] U.S. Cl. ........................................ 173/39; 901/19; 901/25
[58] Field of Search ...................... 173/39; 901/14, 17, 901/23, 25, 19

[56] References Cited

U.S. PATENT DOCUMENTS

| | | | |
|---|---|---|---|
| 4,062,601 | 12/1977 | Pardo et al. | 901/19 |
| 4,566,847 | 1/1986 | Maeda et al. | 901/17 |
| 4,637,771 | 1/1987 | Yasukawa | 901/17 |
| 4,768,911 | 9/1988 | Balter | 901/19 |
| 4,781,517 | 11/1988 | Pearce et al. | 901/25 |
| 4,787,813 | 11/1988 | Stevens et al. | 901/23 |

Primary Examiner—Frank T. Yost
Assistant Examiner—Scott A. Smith
Attorney, Agent, or Firm—Notaro & Michalos

[57] ABSTRACT

A machine tool head comprises a fork fitted to a support having a plurality of degrees of freedom, and a tool unit hinged to the fork. The tool unit contains equipment designed to control a tool carrier so that it can traverse along an axis, and equipment designed to perform controlled tool rotation around that axis. The tool carrier is in the form of a shaft which is mounted on a bushing to which a crown gear is connected. The crown gear engages a first pinion which meshes with a second pinion that is connected to a gear motor. The gear motor and the first and second pinions are mounted as a unit on a hinge to the structure which supports the bushing and a biasing mechanism is provided for urgening the first pinion into meshing engagement with the crown gear.

6 Claims, 3 Drawing Sheets

AUTOMATIC MACHINE TOOL HEAD DESIGNED TO INCREASE THE NUMBER OF MACHINE OPERATING AXES

FIELD AND BACKGROUND OF THE INVENTION

This invention relates to an automatic machine tool head designed to increase the number of machine operating axes.

In particular, the head in accordance with the invention, which basically consists of a fork, fitted to a movable support, which has a number of degrees of freedom and has a tool unit hinged to it, is characterised by the presence of equipment which controls traverse and rotation of the tool in relation to its own axis, whatever the position assumed by the said tool unit in relation to the fork and its support.

In the case of known automatic machine tools the tool can perform movements in relation to a number of axes, the maximum number being 7.

For greater clarity FIG. 1 contains a diagram of a machine tool of this type.

This comprises a structure or column 1 which runs along a base 2; a support 3 of a head assembly marked 4 is fitted to the column.

The figure shows the operating axes of the machine.

Column 1 traverses in the direction of axis X and can rotate around axis B, perpendicular to the former.

Support 3 moves along the column in the direction of axis Y and in the direction of horizontal axis Z, at right angles to Y.

Axis C is the first rotation axis of the head, and has a vector parallel to axis Z. Axis A is the second rotation axis of the head, and its vector rotates on planes at right-angles to the vector of axis Z, according to the position of axis C.

In the most modern machines the tool can move in relation to its support or tool unit (6) in accordance with an axis W coaxial to axis Z when the tool unit rotation in relation to axis A is 0 degrees.

The above details describe the state of the art.

However, special operating situations arise in which the tool needs to be moved in relation to a further axis, and in particular in which the tool needs to be rotated around an axis whose vector coincides with that of axis W, the tool movement being controlled with maximum precision.

For example, this is the case when the apparatus is used as a mechanical hand to position parts with precision or when special tools such as pairs of bits, riveting tools, etc. are used.

SUMMARY OF THE INVENTION

Currently known machine tools do not offer this facility which is provided by the head in accordance with the invention; due to the special characteristics of its tool unit the latter allows tool movements to be performed in relation to axis W and rotation in relation to a further axis which we will call C1, parallel to the former.

In particular, in the head in accordance with the invention, the tool is fitted at the end of a hollow shaft which can traverse axially driven by a gear motor unit which in turn is fitted to a rotary support driven by a second gear motor under the control of a rotary transducer, also integral with the shaft.

BRIEF DESCRIPTION OF THE DRAWINGS

The invention will now be described in detail by way of example but not of limitation, with special reference to the annexed figures in which.

DESCRIPTION OF THE PREFERRED EMBODIMENT

In a head in accordance with the invention the tool carrier, which may, for example, be an electric chuck or another device of known type, is fixed to the end of a hollow shaft 7 fitted on bearings 8 inside a bushing 9.

Figure 3:
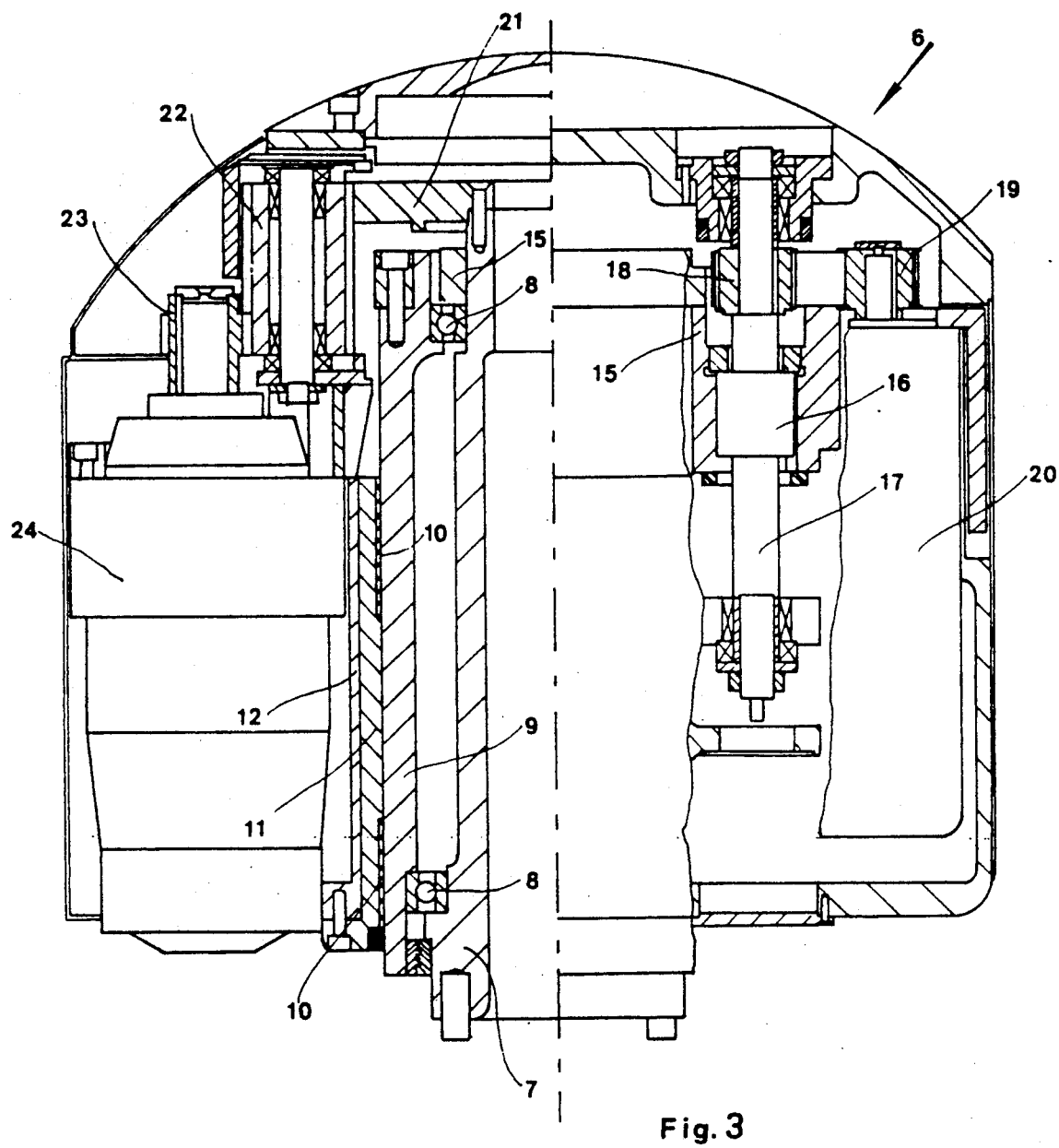
FIG. 3 is a cross-section along axis A—A of FIG. 2.

Bushing 9 can run on plain bearings 10 in a jacket 11 fixed to structure 12 of the tool unit assembly marked 6 in FIG. 3.

Figure 1:
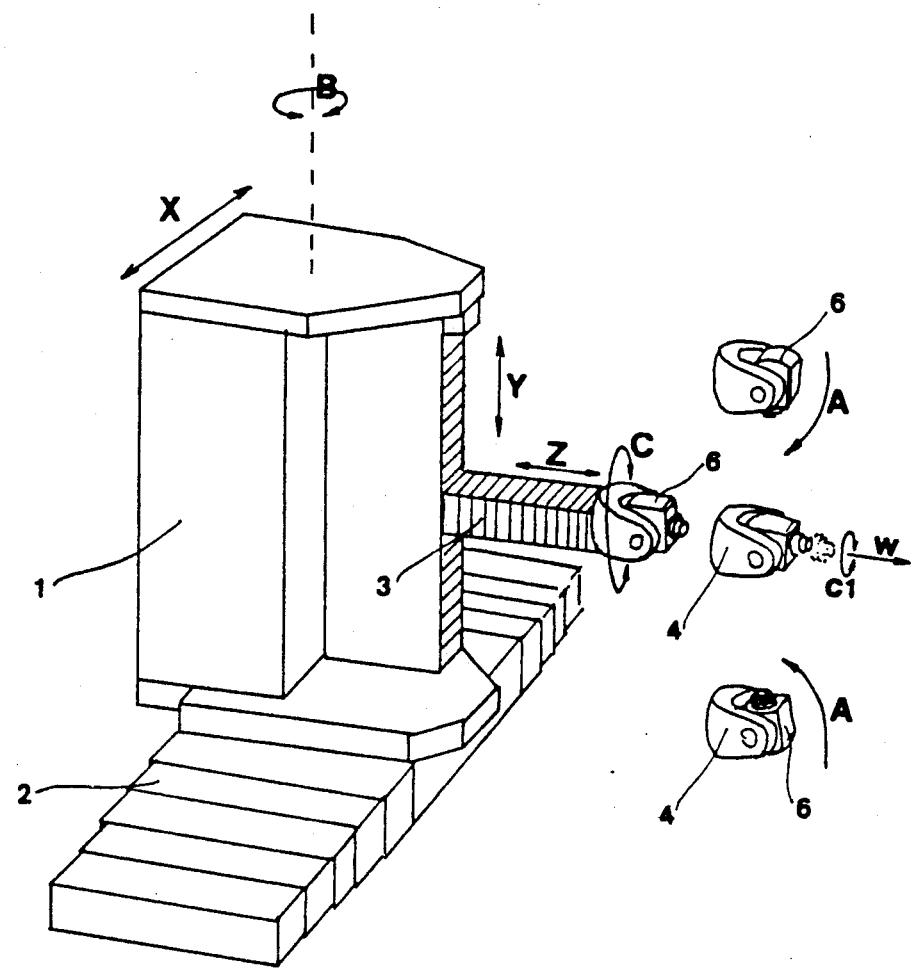
FIG. 1 is a perspective exploded view of a known automatic machine tool which can be used with the tool head of the present invention.
Figure 2:
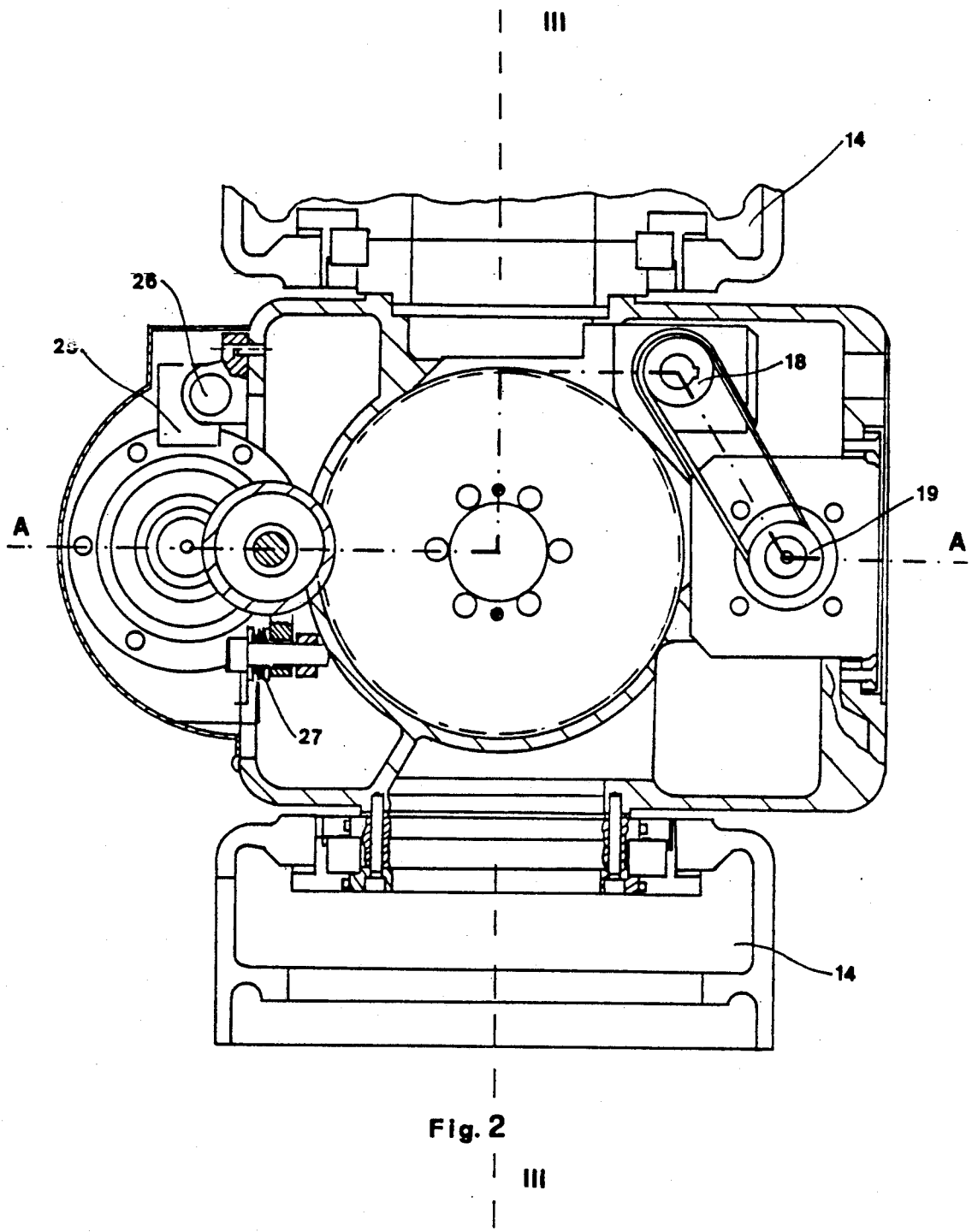
FIG. 2 is a rear view of the tool unit in a head in accordance with the invention.

The tool unit can rotate around axis III—III in relation to the support fork arms shown in diagram form in FIG. 2 and marked 14.

Bushing 9 is integral with a support 15 which engages a scroll part 16 and roller circulation screw 17 to which a pulley 18 is keyed to form axial drive means for the busing. The latter engages a pulley 19 driven by a motor 20. Motor 20 should preferably be of the DC rare earth type.

As a result, motor 20 rotates screw 17 around its axis, causing traverse of scroll, part 16 and consequent axial sliding of bushing 9 and hollow shaft 7 with the tool fitted to it.

Crown gear 21, also fitted to hollow shaft 7, engages a pinion 22 which in turn engages pinion 23 of a gear motor unit 24.

The height of pinion 22 is sufficient to allow crown gear 21 to run along it following the movements of hollow shaft 7.

Gearmotor 24 and pinions 22 and 23 are fitted to a support 25 (FIG. 2) which is hinged at 26 to the structure of the tool unit and is subject to the action of biasing means in the form of a Belleville washer 27 which tends to keep pinion 22 pressed against crown gear 21 to eliminate any play.

The amplitude of rotation of crown gear 21 is detected by a rotary transducer connected to machine control devices.

The unit operates as follows:

First position the head in relation to the work piece with movements along 6 axes, then move the tool in relation to axes W and C1.

If, for example, the machine is used as a mechanical hand, it may be appropriate to move the tool in relation to axis C1 first in order to angle it, and then control its advance. In this case the machine control devices activate gear motor unit 24 which, via the pair of pinions 22 and 23, drives crown gear 21 which rotates together with hollow shaft 7 to which the tool is fitted.

The amplitude of rotation is detected by the rotary transducer.

The action of Belleville washer 27 on the support to which gearmotor 24 and pinions 23 and 22 are fitted keeps the latter pressed against the toothing of crown gear 21, thereby eliminating any play which may arise, for example as a result of wear.

Once the tool has been rotated, its advance can be controlled.

For this purpose motor 20, which turns screw 27 via a pair of pulleys 19 and 18, is activated.

Scroll 16, integral with support 15 of bushing 9, then runs along the shaft, drawing with it the assembly constituted by the bushing and hollow shaft 7, fitted inside the bushing on bearings 8.

The amplitude of the traverse naturally depends both on the length of screw 17 and on the length of pinion 22; the toothing of crown gear 21 runs along that of pinion 22. An expert in the field could devise numerous modifications and variations, all of which should be deemed to fall within the ambit of this invention.

I claim:

1. An automatic machine tool head, comprising:
   a fork (14) adapted for movement in a plurality of degrees of freedom;
   a tool unit assembly (6) mounted for rotation to said fork about a fork axis;
   a bushing (9) mounted for axial movement to said tool unit assembly along a tool carrier axis;
   a hollow tool carrier shaft (7) mounted for rotation around said tool carrier axis, to said bushing;
   a crown gear (21) connected to said shaft for rotation with said shaft;
   a support (25) connected at a hinge (26) to said tool unit assembly, for pivotal movement of said support toward and away from said crown gear;
   a first pinion (22) mounted for rotation to said support and meshed with said crown gear for rotation of said crown gear with rotation of said first pinion;
   a second pinion (23) mounted for rotation to said support and meshed with said first pinion for rotation of said first pinion with rotation of said second pinion;
   a gear motor (24) mounted to said support and connected to said second pinion for rotating said second pinion;
   axial drive means connected to said bushing and mounted to said tool unit assembly for moving said bushing axially along said tool carrier axis; and
   biasing means (27) operatively engaged between said support and said tool unit assembly for biasing said support toward said crown gear to press said first pinion into meshing engagement with said crown gear to eliminate play between said first pinion and said crown gear.

2. An automatic machine tool head according to claim 1 wherein said axial drive means comprises a scroll part (16) connected to said bushing for axial movement with said bushing, a roller circulation screw (17) threaded into said scroll part and mounted for rotation to said tool unit assembly, and a second motor (20) mounted to said tool unit assembly and engaged with said roller circulation screw for rotating said roller circulation screw to move said scroll part axial along said screw.

3. An automatic machine tool head according to claim 2 wherein said first pinion is elongated in a direction parallel to said tool carrier axis so that said crown gear is axially moveable along said first pinion while maintaining a meshing engagement between said first pinion and said crown gear, with axial movement of said bushing along the tool carrier axis.

4. An automatic machine tool head according to claim 3 including a pulley (18) connected to said roller circulation screw, a further pulley (19) connected to said second motor, and belt means engaged between said pulleys for rotation of said screw with rotation of said pulleys.

5. An automatic machine tool head according to claim 4 wherein said biasing means comprises a spring washer.

6. An automatic machine tool head according to claim 1 wherein said biasing means comprises a spring washer.

* * * * *